United States Patent
Ji et al.

(10) Patent No.: US 7,370,646 B2
(45) Date of Patent: May 13, 2008

(54) APPARATUS AND METHOD FOR SLICING AN INGOT

(75) Inventors: Eunsang Ji, Kumi (KR); Kyungmoo Lee, Kumi (KR)

(73) Assignee: Siltron Inc., Kumi (KR)

( * ) Notice: Subject to any disclaimer, the term of this patent is extended or adjusted under 35 U.S.C. 154(b) by 4 days.

(21) Appl. No.: 11/734,771

(22) Filed: Apr. 12, 2007

(65) Prior Publication Data

US 2007/0186917 A1    Aug. 16, 2007

Related U.S. Application Data

(62) Division of application No. 11/256,331, filed on Oct. 21, 2005.

(30) Foreign Application Priority Data

Nov. 23, 2004   (KR) .................... 10-2004-0096218

(51) Int. Cl.
    *B28D 1/00*   (2006.01)
(52) U.S. Cl. .................... 125/16.02; 125/21; 83/651.1
(58) Field of Classification Search ............... 451/36, 451/59, 296, 304; 125/16.02, 21; 83/651.1
    See application file for complete search history.

(56) References Cited

U.S. PATENT DOCUMENTS

| | | |
|---|---|---|
| 5,715,806 A | 2/1998 | Tonegawa et al. |
| 5,937,844 A | 8/1999 | Kiuchi et al. |
| 5,947,798 A | 9/1999 | Toyama |
| 6,062,209 A | 5/2000 | Oishi |
| 6,352,071 B1 | 3/2002 | Kononchuk et al. |
| 6,802,928 B2 | 10/2004 | Nakashima |
| 7,025,665 B2 | 4/2006 | Bender |
| 2004/0084042 A1 | 5/2004 | McAulay et al. |
| 2006/0249135 A1 | 11/2006 | Matsumoto |

FOREIGN PATENT DOCUMENTS

JP          9-262827        10/1997

OTHER PUBLICATIONS

Patent Abstracts of Japan, Publication No. 09-262827; Date of Publication: Oct. 7, 1997; in the name of Nakazato Yasuaki et al.

*Primary Examiner*—Eileen P. Morgan
(74) *Attorney, Agent, or Firm*—Christie, Parker & Hale, LLP

(57) ABSTRACT

A method for slicing an ingot may improve nanotopography at a surface of a wafer. In the method, an ingot is sliced into a plurality of wafers via a slurry while slurry is supplied to a moving wire. A first wire to form a first slicing portion at the wafer firstly slices one side of the ingot. A second wire secondly slices the remaining portion of the ingot to form a second slicing portion continued from the first slicing portion, wherein the first wire has a smaller diameter than that of the second wire.

5 Claims, 8 Drawing Sheets

APPARATUS AND METHOD FOR SLICING AN INGOT

CROSS-REFERENCE TO RELATED APPLICATION

This application is a divisional application of U.S. patent application Ser. No. 11/256,331 filed on Oct. 21, 2005, which claims priority to and the benefit of Korean Patent Application 10-2004-0096218 filed in the Korean Intellectual Property Office on Nov. 23, 2004, the disclosure of which is incorporated herein by reference.

BACKGROUND (a) Technical Field

This application relates to an apparatus and a method for slicing an ingot. More particularly, the present invention relates to an apparatus and a method for slicing an ingot capable of improving fine unevenness of a wafer, i.e., its nanotopography.

(b) Description of the Related Art

Generally, a wafer manufacturing process includes an ingot growing process, a slicing process, an edge grinding process, a lapping process, an etching process, a back side polishing process, a pre-anneal cleaning process, an edge polishing process, and a front polishing process. In the ingot growing process, silicon (Si) is induced from sand and is then purified to make a silicon raw material. A desired impurity is then injected to make an N-type or P-type silicon ingot. In the slicing process, the N-type or P-type silicon ingot produced in the ingot process is cut to have a desired thickness. In the edge grinding process, in order to reduce the roughness and to have a predetermined shape at an edge portion of the wafer that is caused by the slicing process, the edge portion of the wafer is polished. In the lapping process, in order to improve the flatness on the front and back surfaces of the wafer that have been cut to a given thickness, the surfaces of the wafer are polished. In the etching process, in order to remove remaining fine cracks or defects on the surface of the wafer that is polished in the lapping process, the surface of the wafer is etched using a chemical reaction. In the back side polishing process, in order to improve the flatness of the back side surface of the wafer and to remove damage thereof caused by the etching process, the back side surface of the wafer is polished. In the pre-anneal cleaning process, in order to compensate for an incomplete lattice defect structure occurring on the surface that is caused by the etching process, annealing and cleaning processes are performed on the surface of the wafer. In the edge polishing process, in order to reduce surface damage and poor flatness at the edge portion of the wafer caused by the etching process, the edge portion of the wafer is polished. Finally, in the front polishing process, in order to repair damage and improve the flatness of the front side of the wafer occurring by the etching process, the front side of the wafer is polished.

As described above, the wafer manufacturing process produces a polished wafer by successively performing the ingot growing process, the slicing process, the lapping process, the etching process, and the polishing processes. More specifically, in the slicing process, an ingot made in the ingot growing process is cut into thin sheets using a cutting tool. In the cutting tool, a highly tensioned steel wire is wound around a plurality of grooved rollers with a predetermined pitch, and slurry is supplied to the wire. The wire is carried over the grooved rollers along one direction or in a reciprocative manner at high speed. The ingot is pressed onto the wire at a predetermined speed, while the slurry is supplied to the wire.

Due to the cutting force of the wire, the ingot is sliced into thin sheets of wafer via the slurry.

In the slicing process, the wire and the ingot are formed with a circular section of a predetermined diameter and a feed rate is varied to be high at the beginning and end points of slicing and low at the middle point, wherein a feed rate refers to a feed speed at which the ingot is supplied onto the wire. Accordingly, at the beginning of slicing, it is difficult for the wire to be positioned at a desired position of the ingot. As a result, the sliced wafer may have undesirably high nanotopography at one or more surface portions thereof, even after successively having achieved the lapping process, the etching process, and the polishing processes. High nanotopography generally causes a low yield rate of semiconductor chips.

The nanotopography refers to a nanometer scale height variation or an unevenness of a spatial wave produced on a surface of a wafer; roughness refers to an Å scale height variation, and flatness refers to a µm scale height variation in order to indicate fine surface characteristics. It is desired to develop a design rule capable of preventing poor nanotopography in the development of semiconductor technology. A design rule has been developed to improve fine surface characteristics of a wafer, that is, a nanometer scale wave depending on a chemical and mechanical composite polishing process referred to as CMP (Chemo-Mechanical Polishing). This process has been adapted to meet objectives of the slicing process using the wire in the wafer manufacturing process.

In the slicing process, the use of a conventional wire to slice the ingot causes poor nanotopography, that is, spatial waves on a surface of a wafer. When the sliced wafer has high nanotopography, many failed products are produced even after successively having achieved the lapping process, the etching process, and the polishing processes.

The above information disclosed in this Background section is only for enhancement of understanding of the background of the invention, and therefore, it may contain information that does not form the prior art that is already known in this country to a person of ordinary skill in the art.

SUMMARY

The disclosed embodiments relate to a method and an apparatus for slicing an ingot that may have advantages of improving nanotopography at a surface of a wafer.

An exemplary method and apparatus for slicing an ingot according to an embodiment of the present invention includes firstly slicing one side of the ingot with a first wire to form a first slicing portion at the wafer, and secondly slicing the remaining portion of the ingot with a second wire to form a second slicing portion continued from the first slicing portion, wherein the first wire has a smaller diameter than that of the second wire.

The first wire may be an old wire that has previously secondly sliced the ingot, and the second wire may be a new wire that has not previously sliced the ingot.

The first wire may be supplied in a range of 1 to 20 kilometers (km) and may firstly slice one side of the ingot to a depth in a range of 1 to 25% of the diameter thereof.

In a further embodiment, a feed speed of the ingot is raised in a stepwise manner to the maximum speed (Vmax) or less, the feed speed is controlled corresponding to a diameter variance of the ingot, and the feed speed is maintained to be at the raised speed.

The feed speed may start at a lower speed than a minimum feed speed when controlling the feed speed.

In a further embodiment, a first guide beam attached to one side of the ingot is sliced by a wire, the ingot is then sliced, and a second guide beam attached to the other side of the ingot is finally sliced.

Before slicing, the first guide beam may be attached to one side of the ingot and a second guide beam may be attached to the other side of the ingot by a water-soluble adhesive.

After finally slicing, the sliced first guide beam, the wafer, and the second guide beam may be separated.

The sliced first guide beam, the wafer, and the second guide beam may be separated by water in a range of 70° C. to 95° C.

An apparatus for slicing an ingot according to an exemplary embodiment of the present invention includes first and second work rollers arranged in parallel to each other, a wire continuously wound around the first and second work rollers with a predetermined pitch along a longitudinal direction thereof, an ingot placed onto the wire between the first and second work rollers, a slurry supplier for supplying slurry to the wire arranged at one or both sides of the ingot, and a work plate for feeding the ingot to be sliced onto the wire, wherein the wire is formed with a first wire and a second wire, the first wire connecting with the second wire and having a smaller diameter than that of the second wire.

The first wire may be an old wire that has been previously used to secondly slice the ingot, and the second wire may be a new wire that has not been previously used to slice the ingot.

A third work roller may be further provided such that the first, second, and third work rollers are arranged in a triangular layout. Also, two third work rollers may be further provided such that the first work roller, the second work roller, and the two third work rollers are arranged in a square layout.

An apparatus for slicing an ingot according to an exemplary embodiment of the present invention includes first and second work rollers arranged in parallel to each other, a wire continuously wound around the first and second work rollers with a predetermined pitch along a longitudinal direction thereof, an ingot placed onto the wire between the first and second work rollers, a slurry supplier for supplying slurry to the wire arranged at one or both sides of the ingot, and a work plate for feeding the ingot to be sliced onto the wire, wherein a first guide beam is further provided on one side of the ingot by the wire and a second guide beam is further provided on the other side of the ingot by the work plate.

The first and second guide beams may be respectively formed such that portions facing the ingot have the same curvature as that of the corresponding portion of the ingot.

DETAILED DESCRIPTION OF THE EMBODIMENTS

Exemplary embodiments of the present invention will hereinafter be described in detail with reference to the accompanying drawings.

Figure 1:
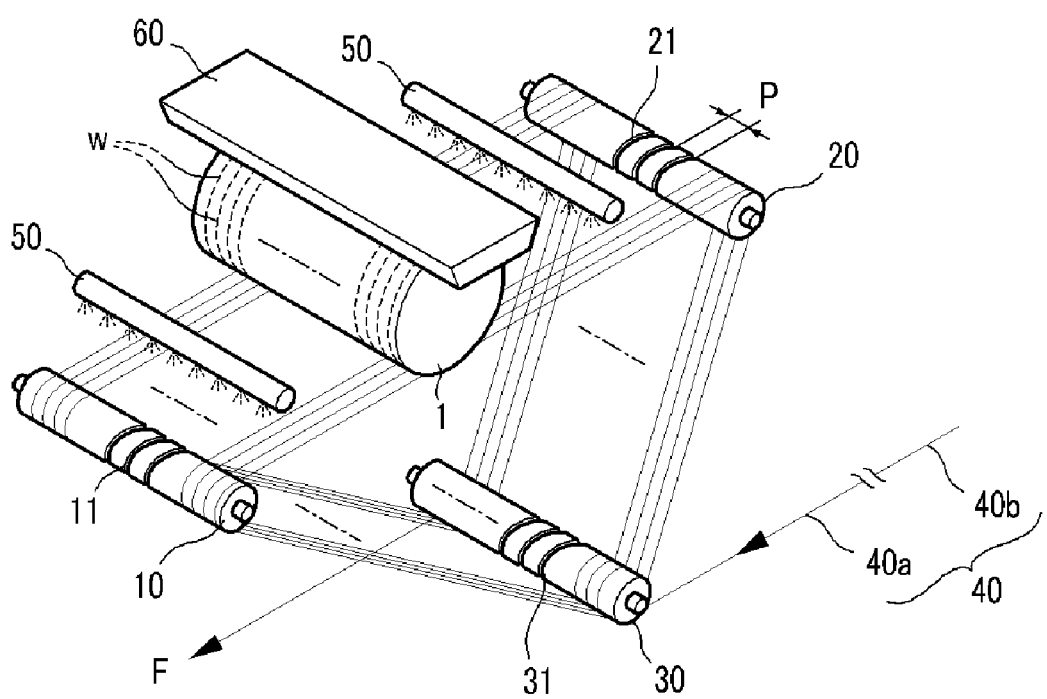
FIG. 1 is a perspective view of an apparatus for slicing an ingot according to a first exemplary embodiment of the present invention.

FIG. 1 is a perspective view of an apparatus for slicing an ingot according to a first exemplary embodiment of the present invention.

Referring to FIG. 1, an apparatus for slicing an ingot includes first, second, and third work rollers 10, 20, and 30, a wire 40, a slurry supplier 50, and a work plate 60.

In order to slice the ingot 1 into a plurality of wafers W, the first and second work rollers 10 and 20 are configured such that a wire 40 is repeatedly wound over these two rollers 10 and 20 and is supported in a tensioned state there between. In detail, the first and second work rollers 10 and 20 are located in parallel, and the first and second work rollers respectively have a plurality of grooves 11 and 21 engraved thereon with a uniform pitch P. To reduce the complexity of FIG. 1 only a portion of the grooves 11 and 21 are illustrated. These grooves 11 and 21 serve as channels for the wire 40. Also, the grooves 11 and 21 are formed spirally on the outer periphery surface of the first and second work rollers 10 and 20. With such structure, the wire can be carried around the first and second work rollers 10 and 20 sequentially or in a reciprocative manner such that when the wire moves in one direction while repeatedly passing around the pair of rollers 10 and 20, it winds its way along the spiral grooves from one end of the rollers 10 and 20 to the other end thereof when slicing the ingot 1.

The third work roller 30 is located below the first and the second work rollers 10 and 20 to provide clearance for the wire 40 at the underside of the rollers 10 and 20 therefrom, so the ingot to be sliced is not interfered with by the wire 40 beneath the rollers 10 and 20. Two or more third work rollers 30 may be provided or no third work roller 30 may be provided. It is desired that the first, second, and third work rollers 10, 20, and 30 are arranged in a triangular layout (see FIG. 1) or a polygonal layout such as a square layout. When no third work roller 30 is provided, the first and second work rollers 10 and 20 may be arranged in parallel. The third work roller 30 has a plurality of grooves 31 that may have the same pitch as that of the grooves 11 and 21 such that the wire is sequentially carried around the first, second, and third work rollers 10, 20, and 30. To reduce the complexity of FIG. 1 only a portion of the grooves 31 are illustrated. As such, the wire 40 is sequentially wound around the first, second, and third work rollers 10, 20, and 30 according to a triangular layout or another polygonal layout thereof. When no third work roller 30 is provided, the wire 40 may be reciprocally wound between first and second work rollers 10 and 20.

The wire 40 is formed as a single strand and is sequentially wound around the first, second, and third work rollers 10, 20, and 30 and is consecutively wound over the neighboring grooves 11, 21 and 31 of the respective first, second and third work rollers 10, 20 and 30. The wire 40 is consecutively wound over the respective first, second, and third work rollers 10, 20, and 30 along the longitudinal direction thereof. The wire 40 forms a layout such that consecutive wire wraps are arranged in parallel with a uniform pitch P along the respective grooves 11 and 21 between the first and second work rollers 10 and 20. The number of grooves in the layout determines the number of sheets of wafers W to be sliced from the ingot 1. To reduce the complexity of FIG. 1 only a portion of the wafers W are illustrated. When a tensile force F is applied to one end of the wire 40 along the arrow direction of FIG. 1, the wire 40 is drawn from the other side thereof in a stretched state around the rollers 10, 20, and 30. The wire 40 is repeatedly wound over the longitudinal neighboring grooves 11, 21, and 31 of the respective first, second and third work rollers 10, 20, and 30 while the first, second, and third work rollers 10, 20, and 30 rotate in one direction. The first, second, and third work rollers 10, 20, and 30 may be rotated by means of a friction force from the moving wire or may be rotated by a driving motor (not shown) coupled to at least one of the rollers 10, 20 and 30.

The wire 40 may be formed as a highly tensional steel wire such as piano wire. The wire 40 may be formed with a constant diameter. The wire 40 may be formed of a first wire 40a and a second wire 40b connected to each other, where the first wire 40a has a smaller diameter than the second wire 40b. The first wire 40a may be a used wire which has previously been used to slice the ingot 1, while the second wire 40b may be a new wire which has not sliced the ingot 1. When beginning the slicing process, the first wire 40a facilitates a slicing action or firstly slices one side of the ingot 1, and then the second wire 40b secondly slices the firstly sliced side of the ingot 1.

In some embodiments, it is desired that the first wire 40a be supplied with a length in the range of 1 to 20 km. When the first wire 40a is safely provided at a desired beginning position of the ingot and slices at the desired position thereof, the sliced wafer W has a thick thickness at the desired portion thereof. The thick portion is subsequently sufficiently polished by successively applying the lapping process, the etching process, and the polishing processes, thereby providing low nanotopography for the wafer. The length of the first wire 40a can be properly determined according to a length of the ingot 1 and the number of sheets of wafer W to be produced therefrom. In some embodiments, when the ingot 1 has a length in a range of 30 to 45 cm and the first wire 40a has a length of less than 1 km, the ingot 1 has a shallow sliced depth thereon. Accordingly, it may be difficult to safely maintain the wire 40 at the desired position of the ingot 1. Also, in some embodiments when the first wire has a length greater than 20 km, the thick portion may be too deeply formed in the sliced wafer W. This may be problematic in that a severe lapping process may then be needed.

The ingot 1 to be sliced into a plurality of wafers W is placed onto the wire 40. The slurry supplier 50 is provided to the wire 40 such that slurry is supplied to the wire 40 while slicing the ingot 1. The slurry supplier 50 may be provided at one side of the ingot 1, and preferably at both sides thereof. Particularly, when wire 40 is reciprocally moving, the slurry supplier 50 is provided at both sides of the ingot 1 so that the slurry can be efficiently supplied to the wire 40. The supplied slurry is attached to the surface of the wire 40 and moves along with the wire 40.

The work plate 60 is provided for feeding the ingot 1 onto the moving wire 40. The work plate 60 is reciprocally moved while it is secured to the ingot 1. In other words the work plate 60 feeds the ingot 1 onto the wire 40 along the vertical direction of FIG. 1 so that the wire 40 can slice the ingot 1 into a plurality of wafers W via the slurry. The movement of the ingot 1 attached to the work plate 60 is desired to be controlled at an appropriate feed rate according to a diameter variance of the ingot 1, a linear speed of the wire 40, and a desired nanotopography of the wafers W.

A wafer for manufacturing a semiconductor is produced by sequentially achieving the ingot growing process, the slicing process, the lapping process, the etching process, and the polishing processes.

The apparatus for slicing an ingot configured in this manner can slice the ingot 1 into a plurality of wafers W using different methods.

Figure 2:
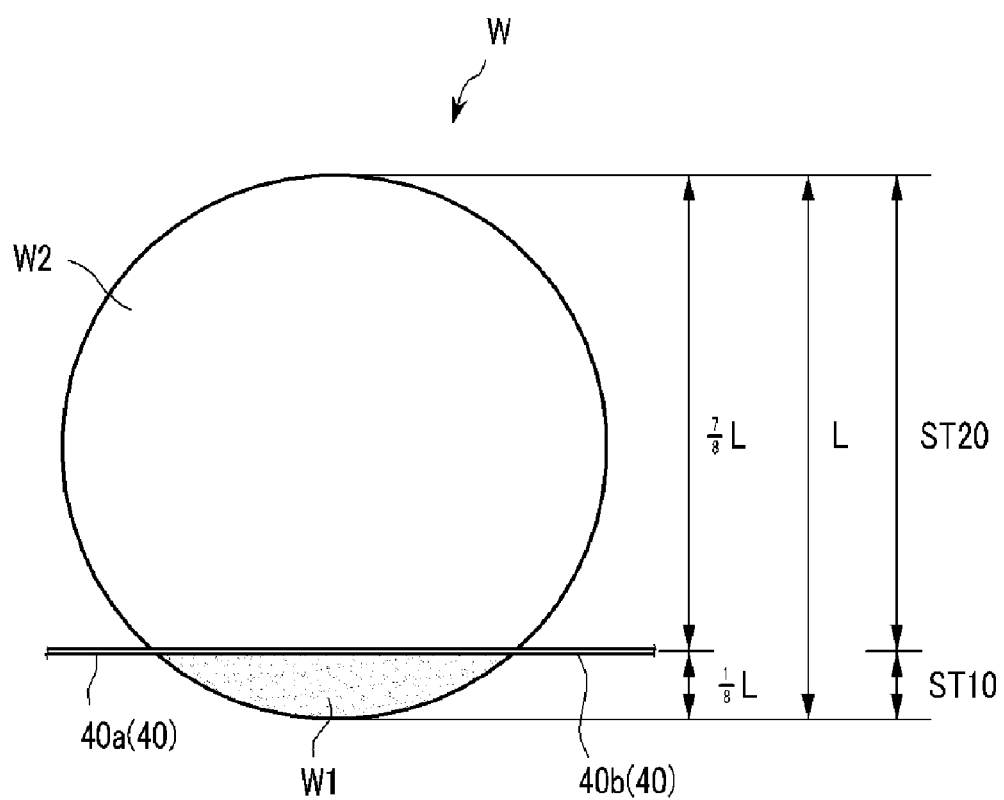
FIG. 2 is a top plan view of a sliced wafer according to a first exemplary embodiment of the present invention.
Figure 3:
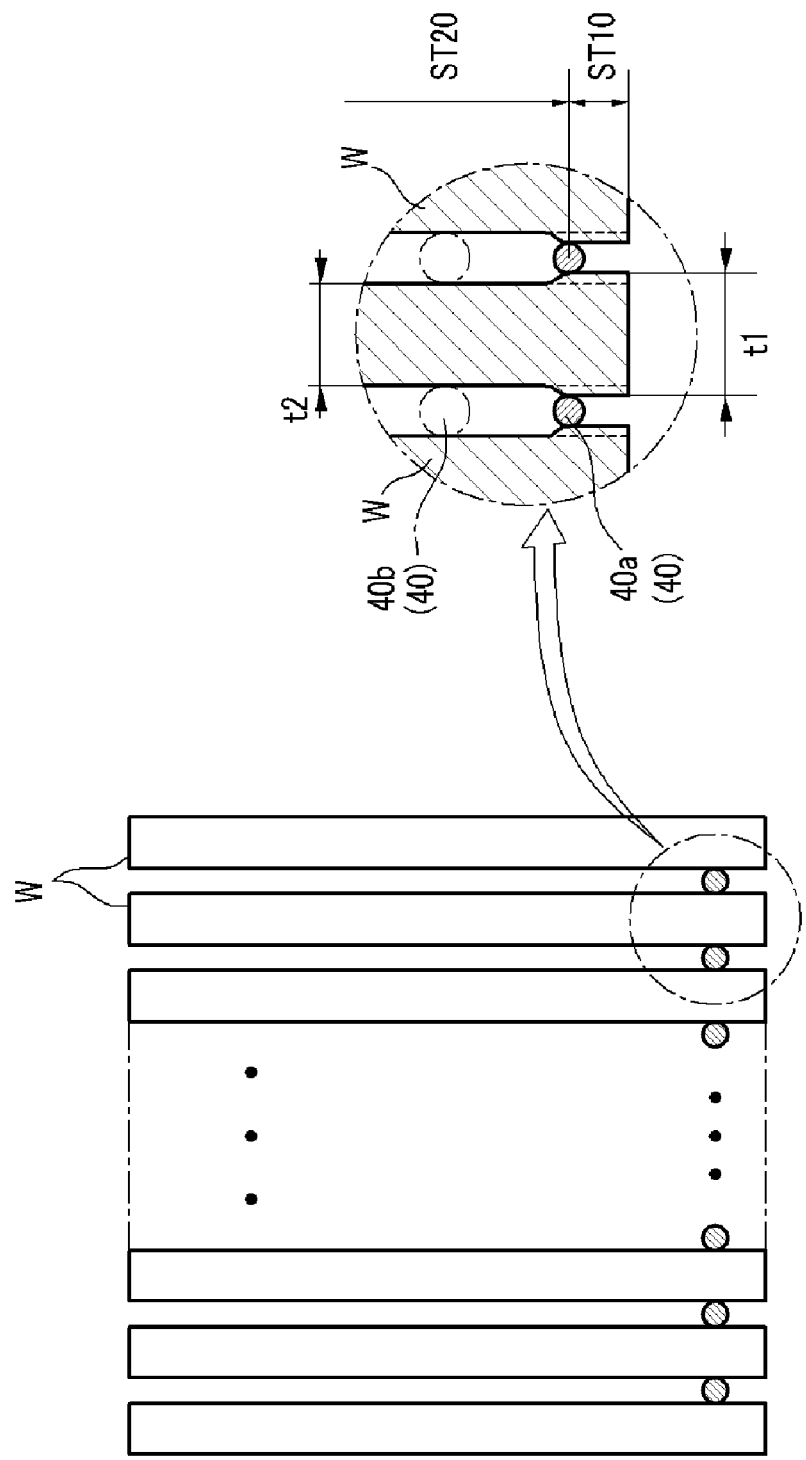
FIG. 3 is a side view of a sliced wafer according to a first exemplary embodiment of the present invention.

FIG. 2 is a top plan view of a sliced wafer according to a first exemplary embodiment of the present invention, and FIG. 3 is a side view of a sliced wafer according to the first exemplary embodiment of the present invention.

Referring to FIG. 2 and FIG. 3, a method for slicing an ingot includes a first slicing step ST10 and a second slicing step ST20.

In the first slicing step ST10, the first wire 40a slices one side of the ingot 1 to form a first slicing portion W1 at the wafer W. The first wire 40a may be an old wire that has been previously used in the second slicing step ST20, and it may be used by rewinding the same. As noted above, the length of the first wire 40a may be provided in the range of 1 to 20 km. With such a length, the first wire 40a can form the first slicing portion W1 at the wafer W by slicing one side of the ingot 1 to a depth in a range of 1% to 25% of the diameter of the wafer W (e.g., length L).

The second slicing step ST20 continues from the first slicing step ST10. In the second slicing step ST20, the second wire 40b slices the remaining portion of the ingot 1 to form a second slicing portion W2 that is continuously connected with the first slicing portion W1. At this time, the second wire 40b may be a new wire as noted above.

The first slicing portion W1 has a thickness t1 that is thicker than a thickness t2 of the second slicing portion W2, since the first slicing portion W1 has been cut by the smaller diameter first wire 40a. In other words, the thickness of a wafer associated with the first slicing portion W1 is t1 and the thickness of a wafer associated with the second slicing portion W2 is t2.

In summary, the first wire 40a can be safely positioned at one side of the ingot 1 as noted above and forms the first slicing portion W1 of a thickness t1. Accordingly, the wafer W may have a desired nanotopography in that the first slicing portion W1 is sufficiently polished in the after-slicing process such as the lapping, etching, and polishing, etc.

Figure 4:
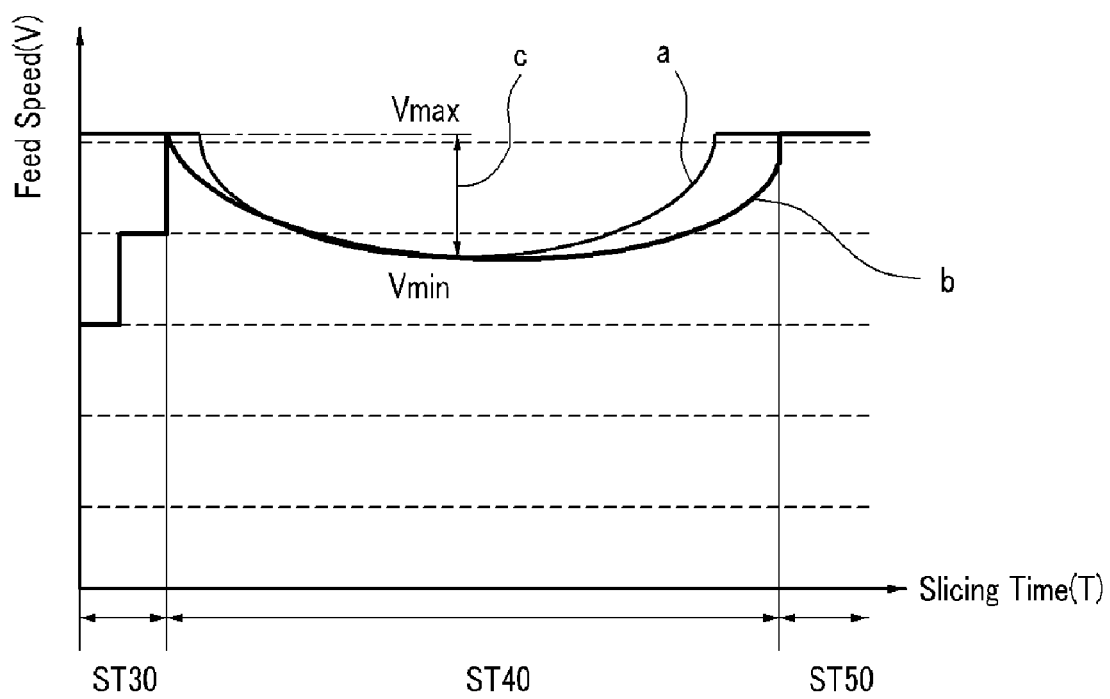
FIG. 4 is a graph showing a relation of a feed rate of an ingot and a slicing time according to a second exemplary embodiment of the present invention.
Figure 5:
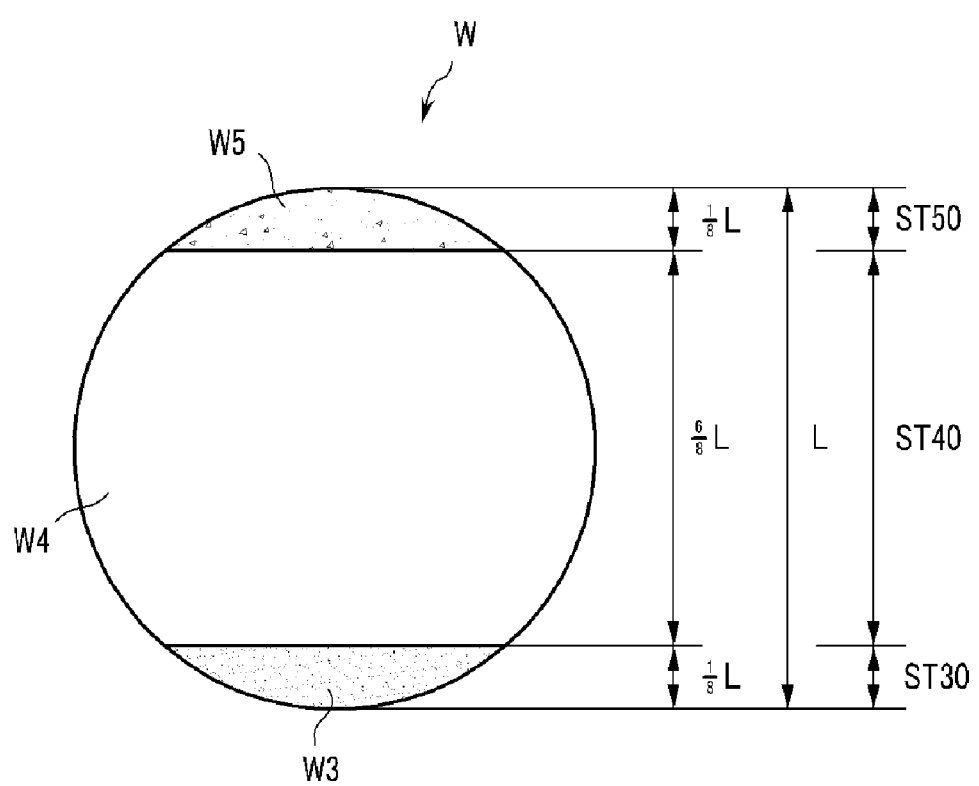
FIG. 5 is a top plan view of a wafer showing a relation of a feed rate of an ingot with a slicing time of FIG. 4.

FIG. 4 is a graph showing a relation of a feed rate of an ingot and a slicing time according to a second exemplary embodiment of the present invention. FIG. 5 is a top plan view of a wafer showing a relation of a feed rate of an ingot with a slicing time of FIG. 4.

Referring to FIG. 4 and FIG. 5, a method for slicing an ingot according to the second exemplary embodiment includes a first slicing step (ST30), a second slicing step (ST40), and a third slicing step (ST50). The curve (a) shows a relation of a feed rate of an ingot to slicing time according to a prior art, and the curve (b) shows a relation of a feed rate of an ingot to a slicing time according to this embodiment of the present invention.

In the method for slicing an ingot, a single-diameter wire may be used, or a two-diameter wire may be used with a first wire and a second wire where the first wire has a smaller diameter than that of the second wire, as noted above.

In the first slicing step ST30, a feed speed V of the ingot 1 is raised in a stepwise manner to the maximum speed Vmax or less. The feed speed V starts at a lower speed than a minimum feed speed Vmin of the second slicing step ST40 and is raised in two steps to a maximum speed Vmax or less. The feed speed V may be raised in two or more steps and the raised feed speed V may be the same as the maximum speed Vmax or may be less than that.

As such, in the first slicing step ST30, the feed speed V is maintained to be at a low level and is raised in level in a stepwise manner. As a result, the wire 40 can be safely positioned onto the ingot 1 at the beginning of slicing and can slice the same with a stepwise increase in speed.

Also, the feed speed V is raised in a stepwise manner from a low speed to a high speed so that the wire 40 can be safely positioned onto the ingot 1 and a first slicing portion W3 can have the same plane as that of second and third slicing portions W4 and W5. Accordingly, the wafer W may have a desired nanotopography after the first slicing portion W1 is sufficiently polished in the after-slicing process such as the lapping, etching, and polishing, etc.

The second slicing step ST40 is continued from the first slicing step ST30. In the second slicing step ST40, the feed speed V is controlled in correspondence to a diameter variance (c) of the ingot 1. Here, the diameter may relate to the distance across the ingot at the current path of the wire through the ingot. For example, when the wire 40 moves at a constant speed and slices one side of the ingot 1 from a smaller diameter portion to a larger diameter portion, for example, from the point 1/8L of FIG. 5 to the center thereof, the feed speed (V) is gradually reduced toward the larger diameter. When the wire 40 passes through the center of the ingot 1 and slices the ingot 1 from the larger diameter portion to the smaller diameter portion, the feed speed (V) is gradually increased toward the smaller diameter portion of the ingot. The third slicing step ST50 is continued from the second slicing step ST40. In the third slicing step ST50, the last portion of the ingot 1 is sliced while the feed speed V is maintained to be at, for example, a raised speed V.

At this time, the raised feed speed V may be the same as the maximum speed Vmax or it may be less.

Such a method according to a second exemplary embodiment of the present invention may be applied to the apparatus for slicing an ingot (for example, not including a first guide beam and a second guide beam) according to a first exemplary embodiment of the present invention.

Figure 6:
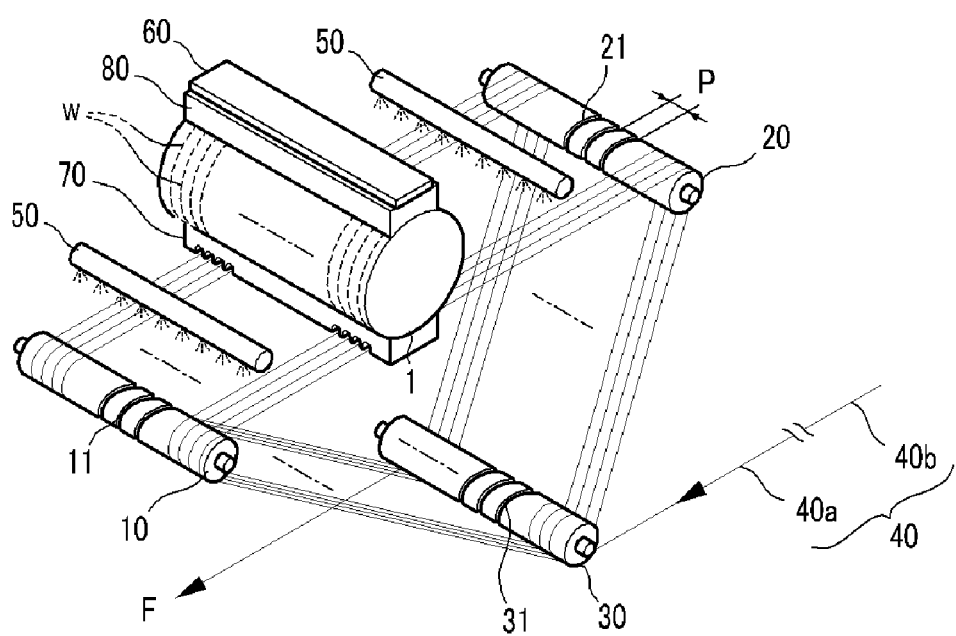
FIG. 6 is a perspective view of an apparatus for slicing an ingot according to a second exemplary embodiment of the present invention.

FIG. 6 is a perspective view of an apparatus for slicing an ingot according to a second exemplary embodiment of the present invention.

For better understanding and ease of description, features according to the second embodiment that are the same as in the first embodiment will not be described in further detail, and only the differences will be focused on in the following description.

An apparatus for slicing an ingot according to a second embodiment further includes a first guide beam 70 and a second guide beam 80, compared to the apparatus for slicing an ingot according to the first embodiment. In the apparatus for slicing an ingot, a singe-diameter wire may be used or a two-diameter wire may be used with a first wire and a second wire where the first wire has a smaller diameter than that of the second wire as noted above.

The first guide beam 70 is provided on one side of the ingot 1 near the wire 40 and the second guide beam 80 is provided on the other side of the ingot 1 near the work plate 60. The first guide beam 70 is firstly sliced, the ingot 1 is sliced, and the second guide beam 80 is finally sliced. It is desirable that the first guide beam 70, the ingot 1, and the second guide beam 80 are attached with, for example, a water-soluble adhesive, and that the water-soluble adhesive is soluble in water of 70 to 95° C. That is, this water-soluble adhesive has a desired adhesive strength and is removed after being sliced. Accordingly, so that it is not removed during slicing, the water-soluble adhesive can be removed at a temperature higher than that of the slicing process.

The first guide beam 70 is firstly sliced while the wire 40 is maintained at a desired position when beginning to slice the ingot 1. Also, the second guide beam 80 maintains the wire 40 at a desired position even after slicing the ingot 1 and fixes the sliced wafer so that it is not directly separated from the remainder of the ingot 1. As a result, the sliced wafer W can have the desired nanotopography.

Preferably, the first and second guide beams 70 and 80 are respectively formed such that portions 71 and 81 (FIG. 8) facing the ingot 1 have the same or substantially the same curvature as that of corresponding portions 1a and 1b (FIG. 8) of the ingot 1. Thus, the first and second guide beams 70 and 80 can be securely attached to the ingot 1.

Figure 7:
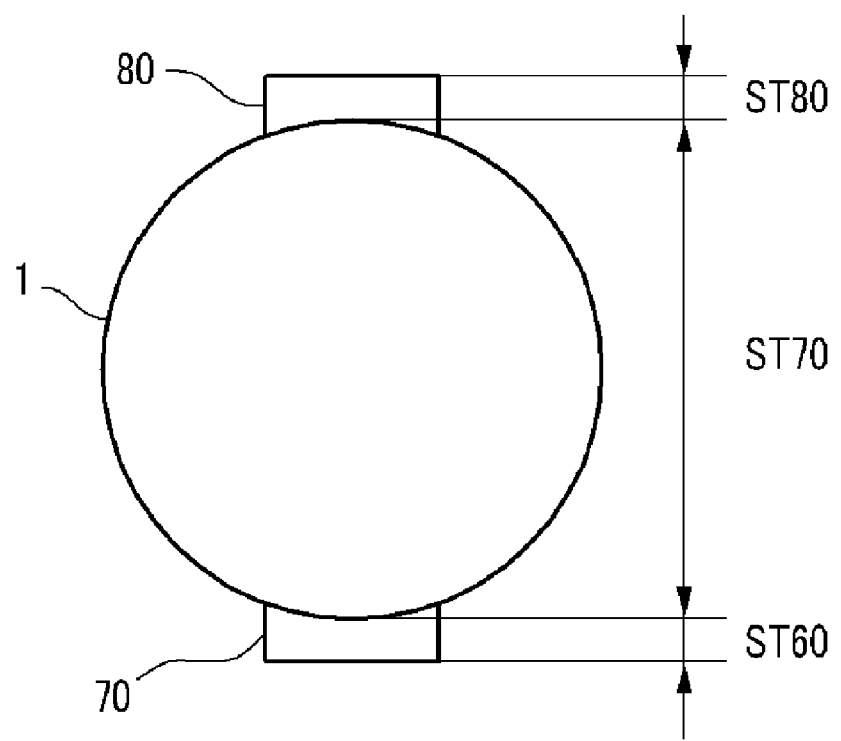
FIG. 7 and FIG. 8 are top plan views of a sliced wafer according to a third exemplary embodiment of the present invention.
Figure 8:
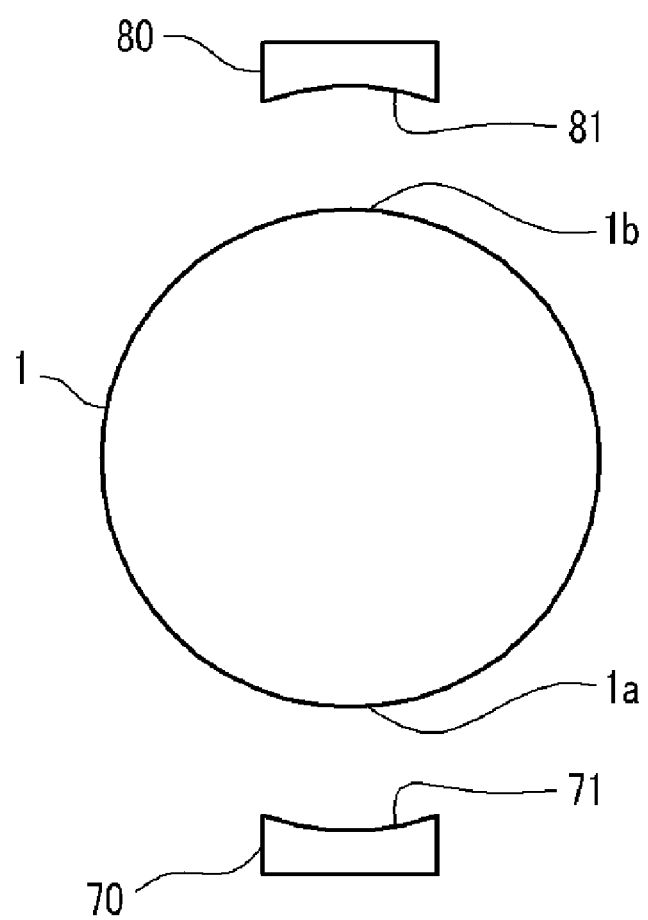

FIG. 7 and FIG. 8 are respectively top plan views of a sliced wafer according to a third exemplary embodiment of the present invention.

A method for slicing an ingot according to the second embodiment of the present invention will hereinafter be described in detail with reference to FIG. 7 and FIG. 8. In this embodiment, a method for controlling the feed rate may be applied to the method for slicing the ingot. In this case, the wafer W can have more improved nanophotography.

The method for slicing an ingot includes a first slicing step ST60, a second slicing step ST70, and a third slicing step ST80.

In the first slicing step ST60, the wire 40 slices the first guide beam 70. When the wire 40 first slices the first guide beam 70 before slicing the ingot 1, the wire 40 can be positioned at a desired position of the ingot 1.

Before the first slicing step ST60, it is preferable that the first guide beam 70, the ingot 1, and the second guide beam 80 are attached with, for example, a water-soluble adhesive.

The second slicing step ST70 is continued from the first slicing step ST60. In the second slicing step ST70, the ingot 1 is sliced. In this case, the wire 40 slices a desired position of the ingot 1 while it is maintained at the desired position by guidance of the first guide beam 70.

The third slicing step ST80 is continued from the second slicing step ST70. In the third slicing step (ST80), the second guide beam 80 is sliced. Therefore, the wire 40 slices the remaining portion of the ingot 1 and continuously the second guide beam 80 while maintaining a desired position. The wire 40 slices the last portion of the ingot 1 safely by guidance of the second guide beam 80. After the third slicing step ST80, it is desired that the ingot be removed from the first and second guide beams 70 and 80, as shown in FIG. 8. The first guide beam 70, the sliced ingot, and the second guide beam 80 can be removed from each other in, for example, water at 70° C. to 95° C.

This water-soluble adhesive and water may be appropriately used without varying the nanotopography.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to some embodiments of the present invention, the first smaller diameter wire firstly slices the ingot 1, and the second larger diameter wire secondly slices the same.

As a result, the wafer W has a thick thickness at a portion where the first wire has sliced. The thick portion can be sufficiently polished by successively applying the lapping process, the etching process, and the polishing processes, thereby providing a desired nanotopography for the sliced wafer.

Also, this desired nanotopography may have an effect to improve a low yield rate of semiconductors.

According to some embodiments of the present invention, the feed speed can be raised in a stepwise manner at a lower speed than the maximum speed and the ingot can be sliced after the first guide beam has been firstly sliced.

As a result, the wire can be safely positioned onto the ingot at the beginning of slicing so that the sliced wafer has a uniform thickness.

Also, a uniform thickness may have an effect to improve a low yield rate of semiconductors.

What is claimed is:

1. An apparatus for slicing an ingot, comprising:

first and second work rollers arranged in parallel to each other;

a wire continuously wound around the first and second work rollers with a predetermined pitch along a longitudinal direction thereof;

a slurry supplier for supplying slurry to the wire, arranged at one or both sides of the ingot; and a work plate for feeding an ingot to be sliced onto the wire between the first and second work rollers, wherein the wire is formed with a first wire and a second wire, the first wire connected to the second wire, having a smaller diameter than a diameter of the second wire to slice a smaller diameter of the ingot.

2. The apparatus for slicing an ingot of claim 1, wherein the first wire has previously been used to slice the ingot.

3. The apparatus for slicing an ingot of claim 2, wherein the first wire has a length in a range of 1 to 20 km.

4. The apparatus for slicing an ingot of claim 1, further comprising a third work roller, wherein the first, second, and third work rollers are arranged in a triangular layout.

5. The apparatus for slicing an ingot of claim 4, further comprising two third work rollers, wherein the first, second, and two third work rollers are arranged in a square layout.

* * * * *

UNITED STATES PATENT AND TRADEMARK OFFICE
CERTIFICATE OF CORRECTION

PATENT NO.         : 7,370,646 B2                                    Page 1 of 1
APPLICATION NO. : 11/734771
DATED              : May 13, 2008
INVENTOR(S)        : Eunsang Ji It is certified that error appears in the above-identified patent and that said Letters Patent is hereby corrected as shown below:

In the Claims

Column 10, line 10, Claim 1         After "wire",
                                    Insert --,--

Signed and Sealed this

Eleventh Day of November, 2008

JON W. DUDAS
*Director of the United States Patent and Trademark Office*